W. L. HALL.
WIRE CLAMPING DEVICE.
APPLICATION FILED AUG. 12, 1914.
1,152,943.
Patented Sept. 7, 1915.
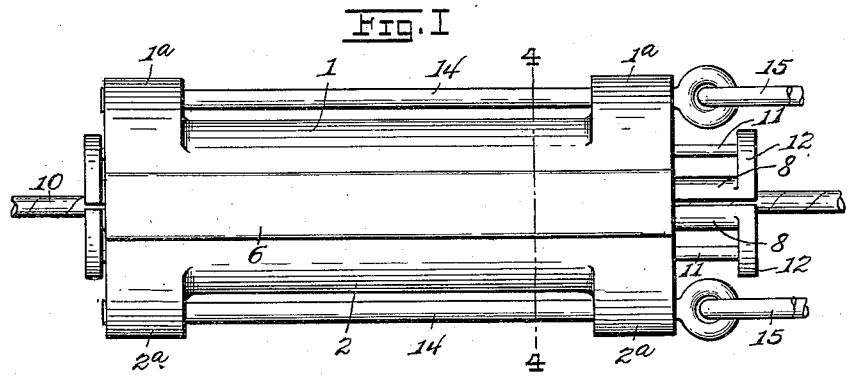
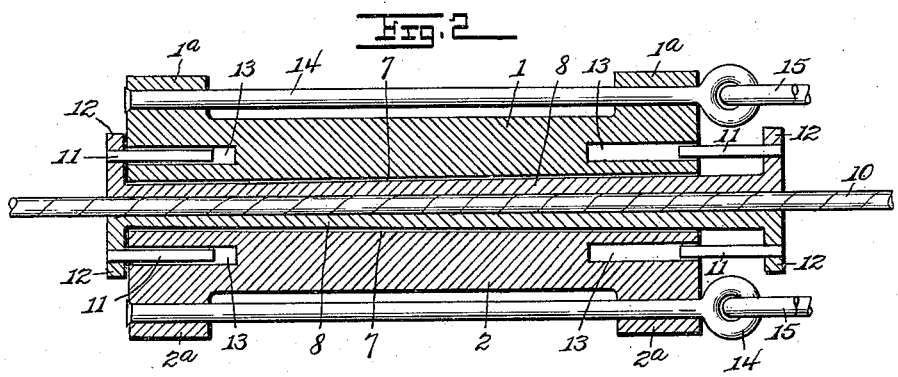
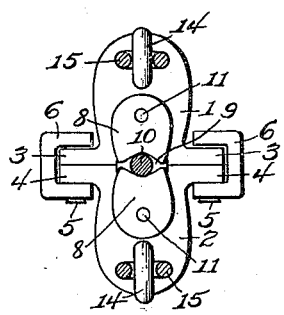
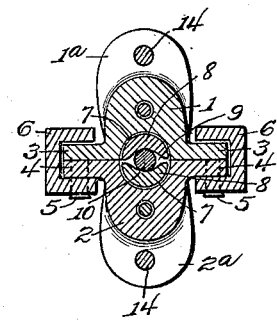
WITNESSES
F. E. Arthur
W. F. Keefer
INVENTOR—
W. L. Hall.
BY
W. E. Dunlap
ATTORNEY.

UNITED STATES PATENT OFFICE.

WILLIAM L. HALL, OF NEWARK, OHIO.

WIRE-CLAMPING DEVICE.

1,152,943.  Specification of Letters Patent.  Patented Sept. 7, 1915.

Application filed August 12, 1914. Serial No. 856,364.

*To all whom it may concern:*

Be it known that I, WILLIAM L. HALL, a citizen of the United States of America, and resident of Newark, county of Licking, and State of Ohio, have invented certain new and useful Improvements in Wire-Clamping Devices, of which the following is a specification.

This invention relates broadly to wire-clamps, and specifically to a clamping device for wires and cables.

The primary object of the invention is to provide a simple and efficient clamp which is specially adapted for use on heavy electric current conducting wires or cables and to which the blocks are attached for taking up slack in the usual manner.

A further object is to provide a clamping device by which substantially the entire surface of the wire is closely embraced, thereby equalizing the strain; which will not injure or break the insulation of insulated wire, and which will not kink the wire, preventing the loss of slack when the blocks are slacked off.

A still further object is to provide a device of the character mentioned which, when applied, cannot fall from the wire, and which, further, may be applied to the wire at a pole and then shoved outward thereover to the desired point.

With these and other important objects in view, the invention resides in the features of construction, arrangement of parts and combinations of elements which will hereinafter be fully described, reference being herein had to the accompanying drawings, forming a part of this specification, in which—

Figure 1 is a side elevation of the invention; Fig. 2 is a longitudinal section of the same; Fig. 3 is a front end elevation of the same; and Fig. 4 is a section on the line 4—4, Fig. 1.

Referring to said drawings, in which like designating characters distinguish like parts throughout the several views—1 and 2 indicate two substantially semi-cylindrical body members, the former having lateral outwardly directed longitudinal flanges 3 and the latter having similar flanges 4, the inner faces of said members and the said flanges being disposed in opposing relation and being slidable one on the other. Rigidly connected to the opposite flanges of one of said members, as by screw-bolts or rivets 5, are longitudinally extending channel members 6 within the embrace of which the flanges of the other body member are received, as shown in Figs. 3 and 4, and by which said body members are maintained in fixed relation except against longitudinal movement wherein one slides on the other. Provided on the inner or adjacent faces of said body members are grooves or channels 7 in which are slidably mounted a pair of oppositely disposed gripping members 8 the inner or adjacent faces of which are grooved or channeled to afford a space 9 within which the wire 10 to be stretched is received. The gripping members 8 are of slightly less thickness at their rear ends than at their front ends—that is, are slightly tapered toward their rear ends—and the grooves 7 in which said gripping members are received are of correspondingly less depth at their rear ends than at their front ends. Thus, when a wire is received between said gripping members, a forward sliding movement of the body members 1 and 2 with respect to said gripping members causes the latter to gradually move inward and to exert a powerful gripping force upon the interposed wire.

For maintaining the assembled relation of the gripping members with their respective body members when the latter are detached one from the other, pins 11 have their outer ends mounted in outwardly projecting flanges 12 provided at the opposite ends of the gripping members 8, said pins lying parallel to the bodies of said members and having their inner ends slidably received in sockets 13 provided therefor in the opposite ends of the adjacent body members. Said pins are of such length that they are not wholly withdrawn from the sockets 13 when the limit of movement of the body members with respect to said gripping members has been reached. Said pins not only serve to maintain the said parts against chance separation, as aforesaid, but also to maintain said parts against rotary movement with respect to each other.

Rigidly mounted in each body member is an eyebolt 14 with an attached link 15, said links being adapted for receiving the hooks of the blocks. Said eyebolts are, in the present instance, shown directed through outwardly directed shoulder-like extensions 1ᵃ and 2ᵃ provided respectively at the opposite ends of the body members 1 and 2.

In applying the device to a wire, the body member 1 is removed from association with the body member 2, and the latter is then placed in a position wherein the wire lies in the groove or channel of the attached gripping member 8. Holding said member 2 in said position, the member 1 is then applied to the opposite side of the wire with the latter received in the groove or channel of the attached gripping member, and the rear ends of the flanges 3 are introduced within the front end of the guides constituted by the channel members 6, after which said members 1 and 2 are forced together to the wire-embracing position indicated in Figs. 1 and 2 of the drawings. Prior to reassembling or applying the parts to the wire, as just described, the gripping members 8 are moved to the limit of their forward movement so that the space 10 will be of ample capacity to accommodate the wire. After the application of the device to the wire, as aforesaid, tension applied to the body members through the eyebolts 14 causes said members to move forward with respect to the wire-embracing gripping members, causing the latter to gradually increase their grip upon the wire. As is obvious, the greater the tension applied to said body members, the greater will be the gripping pressure on the wire.

It will be noted that, due to the fact that the space 9 is uniform from end to end, a uniform pressure is exerted at all points upon the interposed wire, thus preventing injury to the latter even though it be covered with insulation.

What is claimed is—

1. A clamping device comprising opposing relatively slidable body members each having lateral longitudinal flanges, guide members carried by the flanges of one member adapted to embrace the flanges of the other member, said members having in their contiguous faces longitudinal grooves which decrease in depth from the front ends to the rear ends thereof, opposing tapered gripping members mounted in said grooves, each of said gripping members being slidably retained by its corresponding body member.

2. A clamping device comprising opposing relatively slidable and separable body members, means maintaining said body members against lateral separation, said members having their contiguous faces provided with longitudinal tapered grooves, opposing tapered gripping members slidably mounted in said grooves, each gripping member being slidably retained by its corresponding body member, and means for placing said body members under tension.

3. A clamping device comprising opposing relatively slidable and separable body members, means maintaining said body members against lateral separation, said members having their contiguous faces provided with longitudinal tapered grooves, opposing tapered gripping members slidably mounted in said grooves, said gripping members having a greater length than said body members, each gripping member being slidably retained by its corresponding body member, and means for placing said body members under tension.

4. A clamping device comprising opposing relatively slidable and separable body members, means for maintaining said members against lateral separation, said members having tapered grooves in their contiguous faces, opposing tapered gripping members slidably mounted in said grooves, and means carried by each gripping member for preventing dissociation of said gripping member from its corresponding body member, said gripping members having wire-receiving grooves in their contiguous faces.

In testimony whereof, I affix my signature in presence of two subscribing witnesses.

WILLIAM L. HALL.

Witnesses:
 JOHN W. HITCHCOCK,
 EDYTHE GREEN.

Copies of this patent may be obtained for five cents each, by addressing the "Commissioner of Patents, Washington, D. C."